Nov. 17, 1953  E. C. EHLKE  2,659,569
SEALED VALVE
Filed April 27, 1951

INVENTOR.
BY EDWARD C. EHLKE
*John W. Michael*
ATTORNEY

Patented Nov. 17, 1953

2,659,569

UNITED STATES PATENT OFFICE 2,659,569

SEALED VALVE

Edward C. Ehlke, Milwaukee, Wis., assignor to A. P. Controls Corporation, Milwaukee, Wis., a corporation of Wisconsin Application April 27, 1951, Serial No. 223,343

1 Claim. (Cl. 251—87)

This invention relates to sealed valves and particularly to a rotary disk type valve which eliminates rotary or sliding motion at the seal.

While not limited to such use, the present valve is particularly adapted for reversing refrigeration systems to defrost the evaporator coils rapidly or to reverse heating and air conditioning systems to change from heating to cooling or vice versa. The nature of the fluid medium is such that the seal between the valve parts and the manually manipulated part must be extremely efficient. Valves previously designed for such use have had motion in the seal and required, therefore, complex seals which necessarily resulted in high cost valves. These prior valves required fine adjustment and careful maintenance. The present valve eliminates the inherent difficulties of the prior art valves by eliminating rotary or sliding seals. The resulting valve can be produced at low cost, requires no fine adjustment, and is hermetically sealed against leakage.

An object of this invention is to provide a sealed valve in which rotary motion is transmitted to the valve through a stationary seal.

Another object is to provide a sealed rotary disk valve which may be produced at low cost.

A further object is to provide a valve which is sealed against any leakage to the exterior of the system.

Still another object is to provide an effective valve seal which does not move relative to any other valve part.

Other objects and advantages will be pointed out in, or be apparent from, the specification and claim, as will obvious modifications of the single embodiment shown in the drawings, in which:

Figure 4:
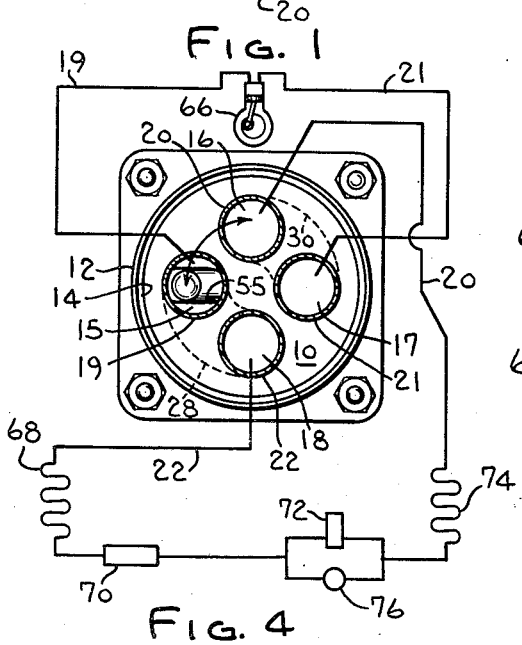
Fig. 4 is a bottom view additionally showing a refrigeration system in diagrammatic form.
Figure 3:
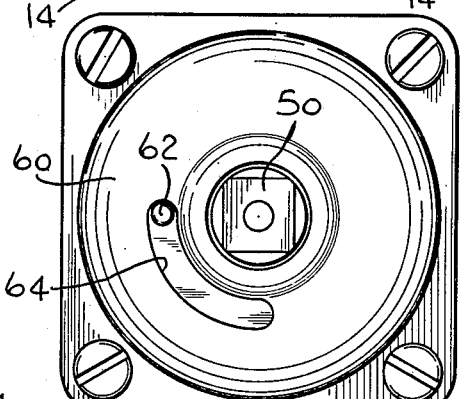
Fig. 3 is a top view with the handle removed.

Referring to the drawings in detail, circular header 10 is threaded in the bottom of the lower portion 12 of the valve housing and is sealed with respect thereto by solder at 14. The header is provided with four through ports 15, 16, 17, 18 which receive conduits 19, 20, 21 and 22, respectively, adapted for connection as hereinafter described. Rotary disk 24 is rotatable about the axis of pin 26 and is provided with two kidney ports or grooves 28, 30, which are of such size as to permit interconnecting the header ports in pairs as may be seen in Fig. 4 where disk port 28 interconnects header ports 15 and 18 and disk port 30 connects header ports 16 and 17. If the disk is rotated 90° clockwise, disk port 28 connects header ports 15 and 16 and ports 17 and 18 are connected by disk port 30.

Disk 24 is biased against the top of header 10 by spring 32 seated against the underside of cupped annulus 34 soldered at 36 to the housing. The bottom of bellows 38 is crimped on the inside edge of annulus 34 to seal the bellows thereto. The joint should be soldered for a hermetic seal. The other end of bellows 38 is apertured to receive stem 40 having a stepped shoulder 42 receiving the inner edge of the bellows which is clamped to the stem by means of retaining ring 44 staked to the stem. This joint is hermetically sealed at 46. It will be appreciated that the bellows completely seals the stem.

The upper end of stem 40 is rotatably received in socket 48 bored in rotary member 50 actuatable by handle 52 connected thereto. The lower end of stem 40 is rotatably received in a radially elongated slot 55 in disk 24. This slot is of such depth that it connects with port 28. The inherent resiliency of bellows 38 urges the stem and member 50 upwardly to hold bearing race 54, supported by flanged annulus 56 staked to member 50, against bearing 58 inserted in the upper portion 60 of the valve housing. Pin 62 in the top of member 50 projects through the 90° arcuate slot 64 in the top of the valve housing to limit valve rotation to 90°.

Figure 1:
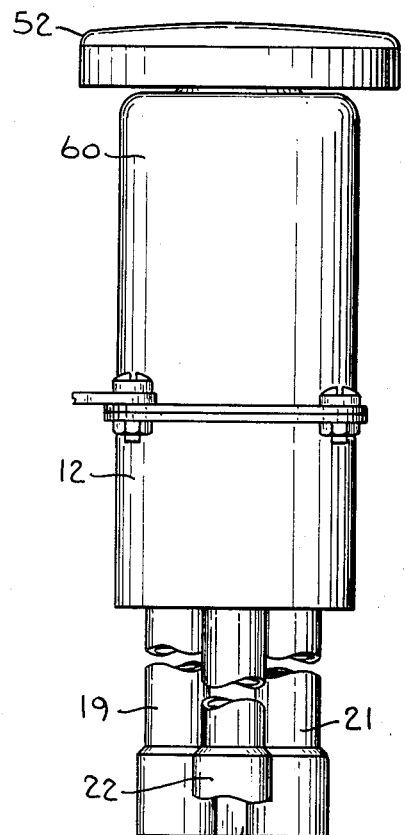
Fig. 1 is an elevation of the valve.
Figure 2:
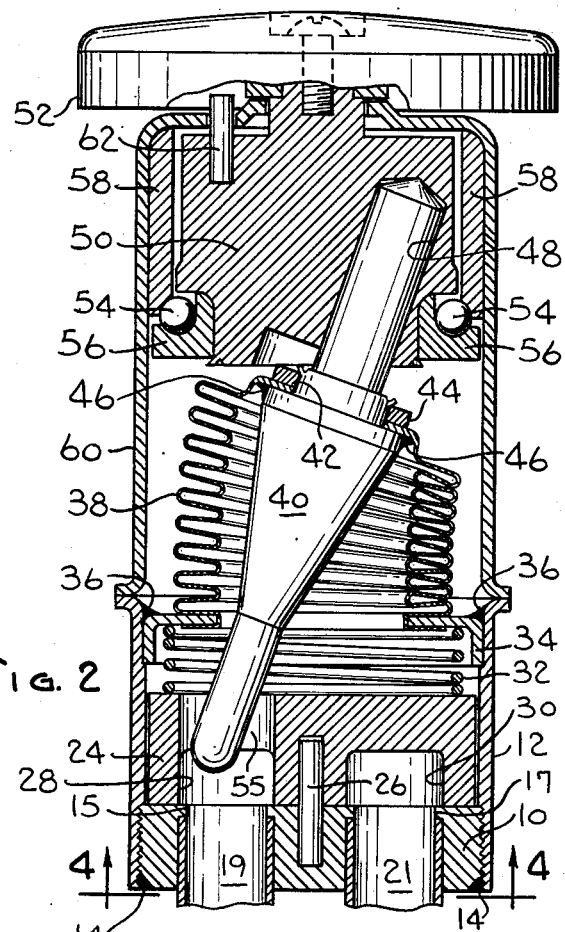
Fig. 2 is a vertical section through the valve.

Valve handle 52 and disk 24 rotate about the same axis, and socket 48 is bored to incline stem 40 so its axis intersects the rotational axis. This inclination deforms the bellows as may be seen in Fig. 2. Since the stem is fixed to the bellows but is rotatable with respect to the handle mechanism and the disk, the handle may be rotated to rotate the disk, without relative movement between the stem and the bellows. Thus the stem rotates relative to member 50 as the member is rotated but remains fixed with respect to the bellows. After the handle has been rotated 90° from the position shown in the drawings, the top of the bellows will be tilted rearwardly. It will be appreciated that relative rotation also takes place between the lower end of the stem and the disk.

Slot 55 allows for minor deviations in the angle of socket 48 without adversely affecting the connection between the stem and the disk. The slot also allows flow from disk port 28 into the bellows and port 28 is designed for connection to the high pressure line to insure a known high pressure in the bellows. This pressure acts on the top of the disk to augment spring 32 in holding the disk in contact with the top of header 10. The high pressure also acts on the bellows 5 to urge it upwardly, thus augmenting the inherent bellows force.

When this valve is used in refrigeration systems, conduit 19 is adapted to be connected to the discharge of compressor 66 (Fig. 4) and the disk port 28 is normally positioned to deliver the discharge to conduit 22 connected to the usual condenser 68 which delivers liquid refrigerant to receiver 70. Thermostatic expansion valve 72 regulates flow to evaporator 74. The evaporator outlet is connected to conduit 20 which communicates with conduit 21 (the compressor suction line) through disk port 30. When the valve handle is rotated 90°, the compressor discharge is connected to conduit 20 and suction line 21 is connected to conduit 22 to reverse flow through the system. When thus reversed, thermostatic expansion valve 72 is bypassed by check valve 76 connected in parallel with the expansion valve. This reversal of flow provides rapid defrosting of evaporator 74 by effectively making it the condenser. The same type of valving is often used to control reverse cycle heating and air conditioning apparatus.

The advantages of this valve will be readily appreciated. The basic valve is a simple, rotary disk valve which may be produced at very low cost but which has heretofore presented great problems as regards effective sealing. The present valve, allowing transmission of rotary motion through a fixed, hermetically sealed bellows, provides a highly desirable, rugged, dependable structure. Since the seal has no moving parts there is no possibility of leakage.

The simplicity of the stem connections to the rotary parts and the manner in which pressure in the system is made to augment the bellows and the spring in holding the parts in place makes manufacture of this valve much simpler than the prior art valves. However, changes will occur to those skilled in the art and for this reason I wish to be limited only by the scope of the claim.

I claim:

A valve comprising a housing including a header having a plurality of conduits therethrough, a rotary member rotatably mounted in the housing and provided with a port cooperable with the conduits to selectively interconnect the conduits as the member is rotated, a manually operable member rotatably mounted in the housing, both of said members being rotatable about substantially the same axis, a straight stem interconnecting said members to transmit rotational movement to said rotary member, said manually operable member being provided with a socket receiving one end of said stem and angularly disposed so as to cause the axis of said stem to substantially intersect the rotational axis of said members, the other end of said stem being received in a generally radial slot in the rotary member to compensate for deviations in the angle of said socket, a bellows fixed and sealed to said housing and to said stem to prevent leakage from the valve, said slot providing communication between said port and the interior of said bellows so the fluid pressure at the port acts on said rotary member to decrease the pressure differential across the rotary member tending to move the rotary member from the header.

EDWARD C. EHLKE.

References Cited in the file of this patent

UNITED STATES PATENTS

| Number | Name | Date |
| --- | --- | --- |
| 1,301,948 | Kaplan | Apr. 29, 1919 |
| 1,644,825 | Fulton | Oct. 11, 1927 |
| 1,702,762 | Brubaker | Feb. 19, 1929 |
| 1,736,974 | King | Nov. 26, 1929 |
| 2,065,834 | Swennes | Dec. 29, 1936 |
| 2,451,678 | Johnson et al. | Oct. 19, 1948 |

FOREIGN PATENTS

| Number | Country | Date |
| --- | --- | --- |
| 353,651 | Germany | of 1922 |